(12) United States Patent
Chu

(10) Patent No.: US 6,262,708 B1
(45) Date of Patent: Jul. 17, 2001

(54) TECHNIQUES FOR DISPLAYING COMPLEX CHARACTERS

(75) Inventor: Sing Yun Chu, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/334,781

(22) Filed: Jun. 16, 1999

(51) Int. Cl.[7] .................................................. G09G 5/16
(52) U.S. Cl. ...................... 345/127; 345/439; 348/468; 348/581
(58) Field of Search ................................... 345/127, 439, 345/429, 430, 141, 467, 471, 128, 129, 130, 472; 382/185, 183, 182, 298; 348/224, 226, 581, 468, 564; 725/37, 131, 139, 151

(56) References Cited

U.S. PATENT DOCUMENTS

| | | | |
|---|---|---|---|
| 5,027,212 | * 6/1991 | Marlton et al. | 348/512 |
| 5,774,666 | * 6/1998 | Portuesi | 725/110 |
| 5,844,552 | * 12/1998 | Gaughan et al. | 725/37 |
| 5,870,084 | * 2/1999 | Kanungo et al. | 345/192 |
| 5,966,637 | * 10/1999 | Kanungo et al. | 725/132 |
| 6,008,820 | * 12/1999 | Chauvin et al. | 345/502 |
| 6,008,836 | * 12/1999 | Bruck et al. | 725/131 |
| 6,067,122 | * 5/2000 | Cahill, III | 348/478 |
| 6,141,002 | * 10/2000 | Kanungo et al. | 345/327 |
| 6,166,780 | * 12/2000 | Bray | 348/632 |

* cited by examiner

*Primary Examiner*—Jeffery Brier
*Assistant Examiner*—Thu-Thao Havan
(74) *Attorney, Agent, or Firm*—Beyer Weaver & Thomas LLP.

(57) ABSTRACT

Systems and methods for rendering a complex character suitable for display on a monitor are provided. A raw character bitmap representing the complex character is filtered to form a filtered bitmap so as to reduce the effects of monitor flicker and enhance image contrast. The filtered bitmap is then scaled down to a target bitmap using a bilinear scaling operation followed by recursive cubic scaling operations. The target bitmap is suitably sized for storage in a memory device coupled to the monitor.

20 Claims, 10 Drawing Sheets

TECHNIQUES FOR DISPLAYING COMPLEX CHARACTERS

BACKGROUND OF THE INVENTION

1. Field of Invention

The invention relates generally to display systems. More particularly, methods and apparatus for displaying complex characters on a monitor are disclosed.

2. Description of Relevant Art

Displaying the contents of WEB pages on standard television monitors has always been a challenging problem due in part to the fact that standard television monitors have a much lower resolution as compared to standard computer monitors. By way of example, FIG. 1 illustrates a conventional NTSC standard TV picture 100. The TV picture 100 is formed of an active picture area 102 that is the area of the TV picture 100 that carries picture information. Outside of the active picture area 102 is a blanking region 104 suitable for line and field blanking. The active picture area 102 uses frames 106, pixels 108 and scan lines 110 to form the actual TV image. The frame 106 represents a still image produced from any of a variety of sources such as an analog video camera, an analog television, etc. In systems where interlaced scan is used, each frame 106 represents a field of information. Frame 106 may also represent other breakdowns of a still image depending upon the type of scanning being used. Information in frame 106 is represented by any number of pixels 108. A pixel ( an acronym for "picture element") is the smallest distinguishable and resolvable area in an image as well as the discrete location of an individual photo-sensor in a solid state camera. Each pixel in turn represents digitized information and is often represented by 8 bits, although each pixel may be represented by any number of bits. Each scan line 110 includes any number of pixels 108, thereby representing a horizontal line of information within frame 106.

In NTSC video (a television standard using interlaced scan), for example, a field of information appears every 60th of a second, a frame (including 2 fields) appears every 30th of a second and the continuous presentation of frames of information produce a picture. An interlaced display is a display in which the lines are scanned alternately in two interwoven rasters. In a conventional interlaced display, there are several hundred horizontal lines in a frame (full screen). These lines are scanned from left to right, and from top to bottom. The refresh rate (number of frames scanned per second) varies, but it is normally between 60 and 100 Hz. Refresh rates slower than 60 Hz produce distracting screen flicker, which can cause headaches and eye fatigue. Since a computer monitor using progressive scan refreshes the frame of information on the screen every 30th of a second with no interlacing of frames, the problem of flicker is substantially eliminated in computer monitors using progressive scan techniques.

It is in part due to the combination of low resolution and the presence of image flicker that presents a substantial challenge to displaying WEB pages, digital images, text, and the like on standard NTSC format monitors. In order to display an image, such as an alphanumeric character on a television monitor, the character image is typically converted to what is referred to as a graphics bitmap suitable for storage in a memory device coupled to the television. Such memory devices are typically included in set top boxes used in conjunction with cable modems, WEBTV™ terminals, and the like.

A conventional approach to displaying the alphanumeric character includes preprocessing the character bitmap to reduce the flicker using various anti-aliasing techniques well known to those skilled in the art. Anti-aliasing is a technique used on a gray-scale or color bitmap displays to make diagonal edges appear smoother by setting pixels near the edge to intermediate colors according to where the edge crosses them. Typically, applying conventional anti-aliasing techniques to character bitmaps to reduce flicker has the effect of blurring the character image. In the case of simply connected characters such as, for example, those characters found in the Roman alphabet, this blurring presents no real problem since the characters remain substantially legible. However, for complex characters that are formed of many strokes, such as those found in the Chinese and Korean language, this blurring renders these multiply connected characters substantially illegible, or in some cases, changes the entire meaning of the character.

Therefore, what is desired are techniques for legibly displaying complex characters typical of, for example, the Chinese and Korean language, on a standard television monitor.

SUMMARY OF THE INVENTION

Broadly speaking, the invention relates to an improved method, apparatus and system for displaying complex characters on a standard television monitor. The invention can be implemented in numerous ways, including as a method, a system, an apparatus, and a computer readable medium. Several embodiments of the invention are discussed below.

According to one aspect of the present invention, a method of rendering an image of a complex character for display on a standard television monitor is described. As a method, a raw character bitmap representing the complex character is filtered and contrast enhanced to form a filtered character bitmap. The filtered character bitmap is then scaled down using multiple type scaling operations to a target character bitmap suitable for storage in a memory coupled to the television. In one embodiment, the filtered character bitmap is initially scaled using a bilinear scaling technique followed by recursive cubic scaling techniques until the filtered character bitmap is reduced in size to that of the target character bitmap.

According to another aspect of the present invention, an apparatus for rendering an image of a complex character for display on a standard television monitor is described. The apparatus includes a filter unit arranged to filter and contrast enhance a raw character bitmap representing the complex character to form a filtered character bitmap. A decimator unit coupled to the filter unit uses multiple type scaling techniques to reduce the size of the filtered character bitmap to that of a target character bitmap suitable for storing in a memory device coupled to the monitor.

In one embodiment, the multiple type scaling techniques include a first bilinear scaling operation followed by recursive cubic scaling operations.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Figure 1:
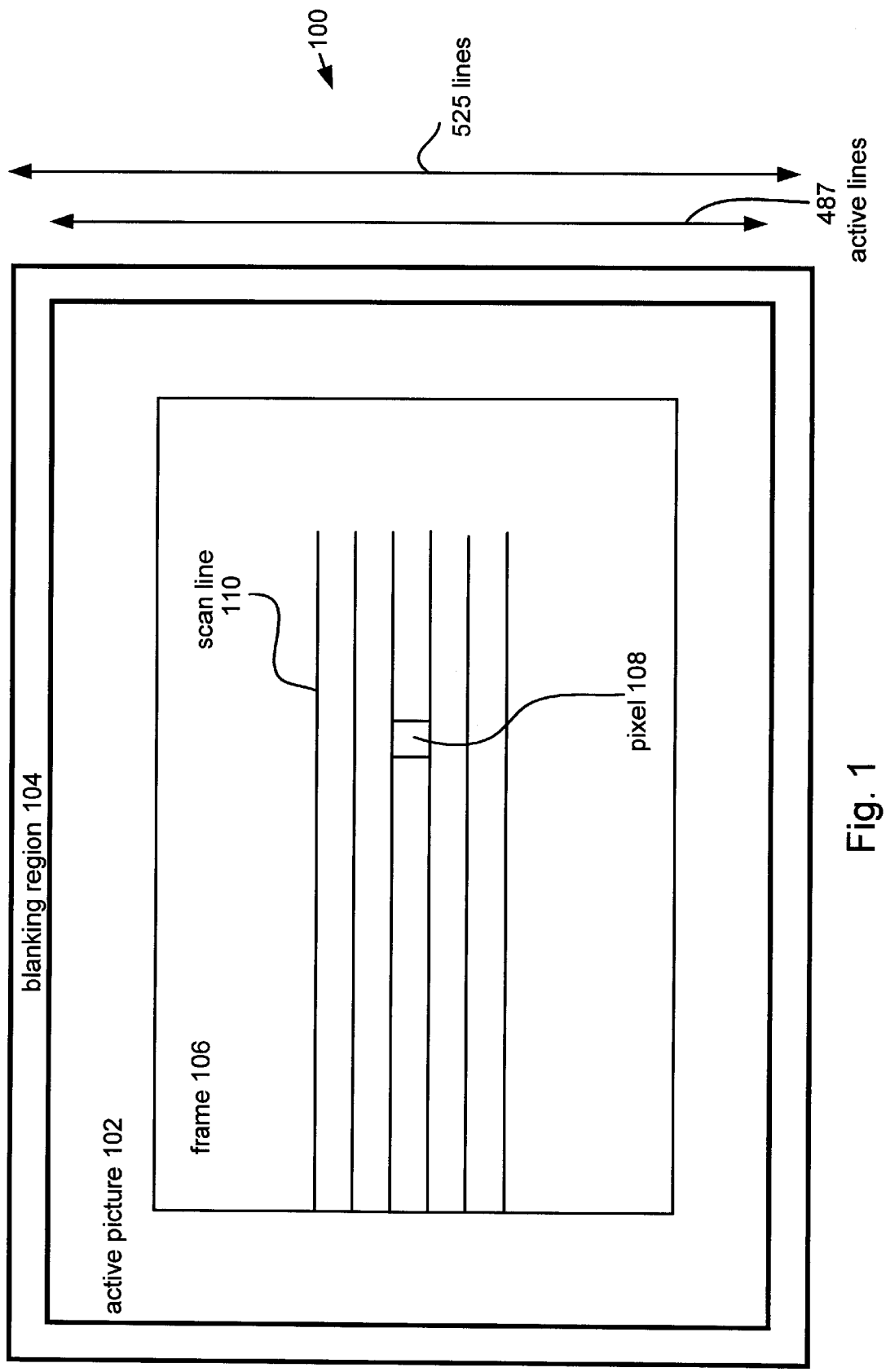
FIG. 1 is a standard television display.

In the following description, frameworks and methods of displaying complex characters on a monitor are described. Although the invention will initially be described in terms of the display of a WEB page on a standard television monitor, the invention also applies to the display of any image containing complex characters. In terms of this discussion, a complex character is that character formed of multiply connected strokes typical of those characters found in, for example, the Chinese and Korean languages. The symbolic nature of these characters makes it of paramount importance that all strokes in the displayed character image are both legible and uncorrupted. The integrity of the character stroke image is important since even a minor change in stroke consistency or placement can render the character illegible or in some cases meaningless in the context in which it appears.

Typically, the character images included in a particular web page are stored in the form of what is referred to as a character bitmap. A bitmap is a data file or structure that corresponds bit for bit with the image displayed on a screen. In most implementations, the bitmap is the same format as it would be stored in the display's video memory or, in other cases, as a device independent bitmap. In either case, the bitmap is characterized by the width and height of the image in pixels and the number of bits per pixel which determines the number of shades of gray or colors it can represent. A bitmap representing a colored image (a "pixmap") will usually have pixels with between one and eight bits for each of the red, green, and blue components, though other color encodings can also used. The green component sometimes has more bits that the other two to cater for the human eye's greater discrimination in this component. In most applications, the character bitmap includes 8 bits representing 256 shades of gray.

In order to make diagonal edges of the characters appear smoother and reduce the effects of flicker omnipresent on interlaced television monitors, a technique referred to as anti-aliasing is used on a gray-scale character bitmaps typical of most web pages. Typical anti-aliasing techniques smooth diagonal edges by setting pixels near the edge to intermediate grays, or colors if applicable, according to where the edge crosses them. The most common example is black characters on a white background. Without anti-aliasing, diagonal edges appear jagged, like staircases, which may be noticeable on a low resolution display such as standard television monitors.

In the described embodiment, an anti-aliasing technique used to produce sharp edges without substantially blurring the resultant complex character image includes a spatial convolution process with a 5×5 gaussian kernal. In order to increase contrast enhancement and thereby more clearly delineate observed edges of the displayed complex character, the convolution divisor is reduced by what is referred to as a contrast enhancement factor. By increasing contrast enhancement, the likelihood that small strokes will be obscured by nearby larger, and therefore apparently, brighter strokes is commensurably reduced.

In addition to reducing the observed flicker and improving contrast enhancement, a series of subsamples (also referred to as decimation) of the filtered bitmap are performed in order to reduce the overall size of the bitmap. In this way, the subsampled bitmap is capable of being stored in the video memory coupled to the television monitor. In the described embodiment, the subsampling includes a first bilinear subsample which reduces the raw character bitmap to an integral multiple of the target character bitmap. Next, a cubic subsample is recursively performed in order to reduce the size of the bitmap to the target size bitmap suitable for storage in the video memory. By using a cubic sampling scheme, the size of the bitmap is reduced without substantial loss in image information. In this way, stroke image integrity is maintained even though the bitmap is reduced from, for example, 128 bits×128 bits to 16 bits×16 bits.

Figure 2:
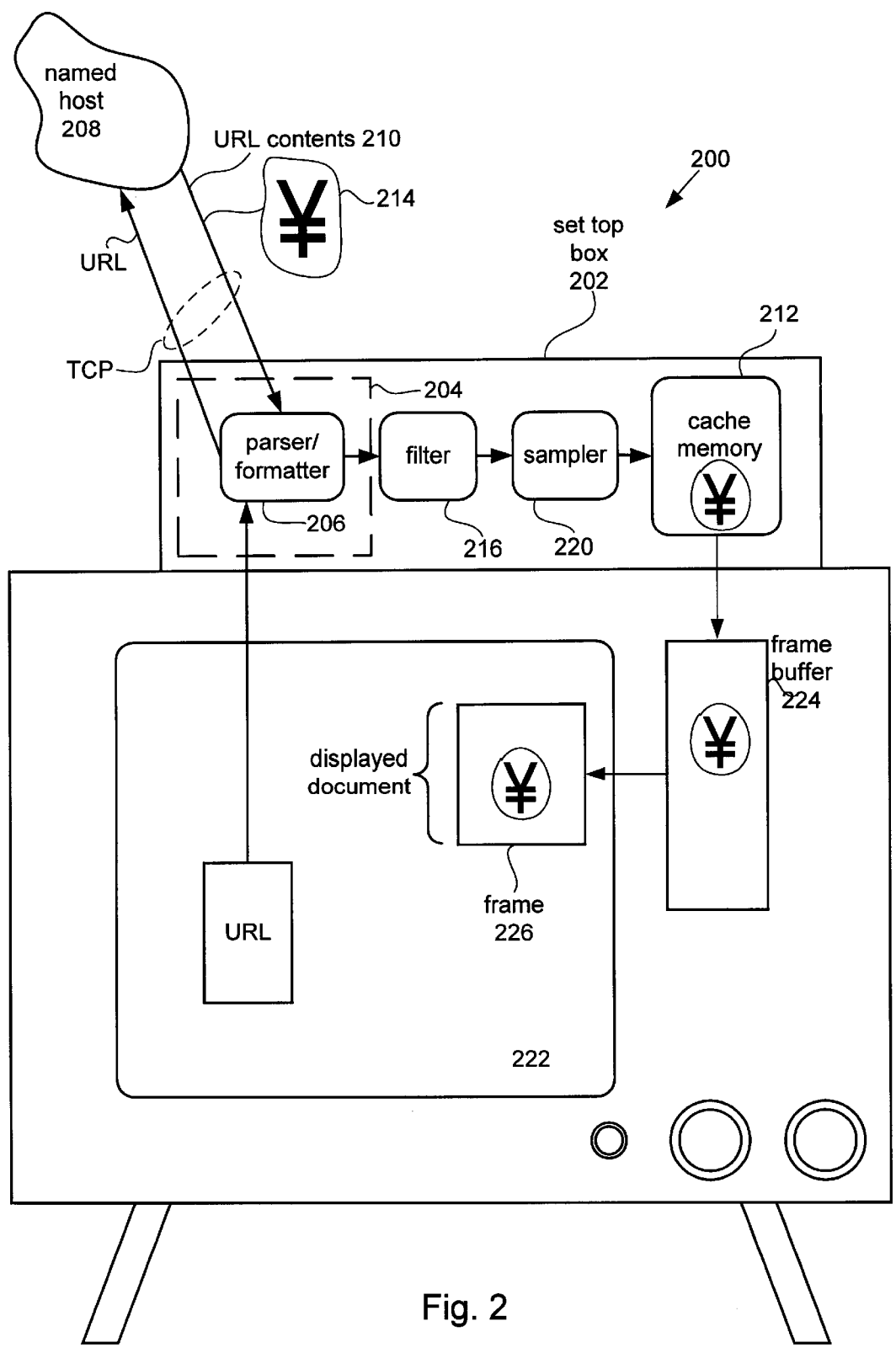
FIG. 2 is a block diagram of a television system having a set top box employed to display a complex character in accordance with an embodiment of the invention.

Most web-TV systems utilize browsers incorporating a very simple approach to networking as illustrated in FIG. 2. An exemplary a web-TV system 200 includes a set top box 202 that hosts a browser 204. The browser 204 includes a parser/formatter 206 that breaks up (parses) a URL (universal resource locator) containing a host name and a document that includes various complex characters rendered as character bitmaps. The parser/formatter 206 breaks the URL into a named host 208 and a requested document 210. In one embodiment of the invention, the requested document 210 takes the form of HTML (HyperText Markup Language) statements well known to those skilled in the art.

Figure 3:
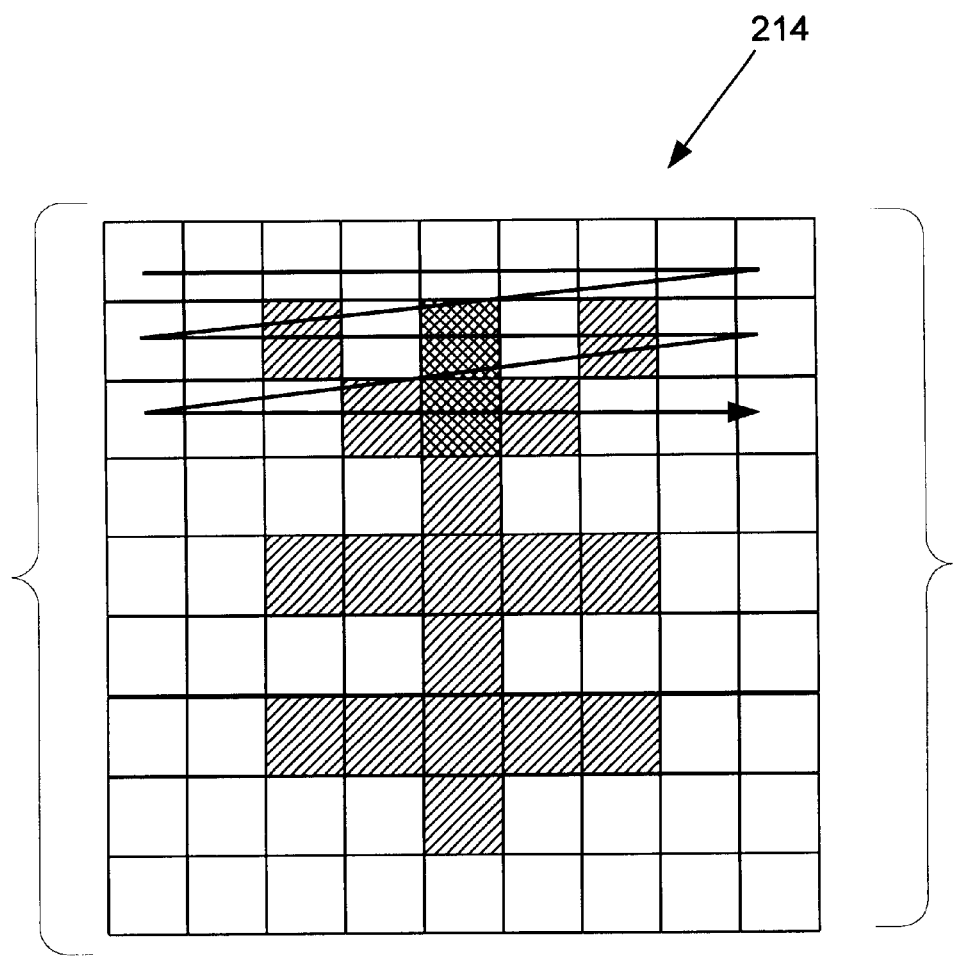
FIG. 3 illustrates an exemplary convolution of a bitmap and a gaussian filter having a 5×5 kernal in accordance with an embodiment of the invention.

In the case where the requested document is not stored in a local cache memory 212, the parser/formatter 206 makes a TCP ("transmission control protocol") connection to the named host 208 and retrieves the URL contents that include the a raw character bitmap 214 associated with the requested URL document 210. The parser/formatter 206 uses the HTML statements corresponding to the requested document 210 to appropriately format the retrieved raw character bitmap 214. The raw character bitmap 214 is then passed to a filter 216 used to reduce the effect of monitor flicker. In the described embodiment, the filter 216 performs a convolution (i.e., matrix multiplication) between the raw character bitmap 214 and a 5×5 gaussian kernal 218 which typically proceeds in the manner illustrated in FIG. 3. In the described embodiment, the convolution process starts at the upper leftmost corner of the raw character bitmap 214 and proceeding in a stepwise fashion left to right and top to bottom to ultimately form a filtered bitmap. In order to re-normalize the amplitude of the filtered bitmap, the filtered bitmap is divided by the sum of the gaussian kernal 218 reduced by a contrast enhancement factor. By sum of the kernal it is meant the summation of all elements of the gaussian kernal. In a preferred embodiment, the contrast enhancement factor is the maximum value of the kernal, which for the described embodiment is "5". Since the image associated with the filtered bitmap is often blurred (mitigating some of the effects of monitor flicker), enhancing the contrast substantially reduces the likelihood of obscuring small strokes by nearby larger and therefore brighter strokes. In this way, the complex structure of the character bitmap 214 is maintained through the filtering process.

Returning to FIG. 2, the filtered bitrnap is then passed to a decimator 220 arranged to reduce the size (decimate) of the filtered bitmap to that of a target bitmap suitable for storage in the video (cache) memory 212. In order to reduce the size of the filtered bitmap to that of the target bitmap, a bi-linear scaling operation is first performed reducing the size of the filtered bitmap to a first scaled bitmap having dimensions that are an integral multiple of the dimensions associated with the target bitmap. By way of example, if the filtered bitrnap is 128×128 and the dimensions of the target bitmap is 20×20, the bi-linear scaling operation reduces the size of the raw bitmap to one having dimensions of 80×80. These particular dimensions are appropriate since 80×80 are the dimensions of the largest bitmap that are an integral multiple (i.e., "4") of the target bitmap (20×20).

The decimator 220 then recursively performs a second scaling operation, which in the described embodiment is a cubic scaling operation that reduces the first scaled bitmap to the dimensions of the target bitmap. By using cubic scaling, information that would otherwise be lost using a conventional averaging method is effectively avoided. In this way, the target bitmap retains substantially all the information contained in the filtered bitmap thereby maintaining stroke integrity in the displayed complex character. The target bitmap is then stored in the cache memory 212 until such time as the complex character is to be displayed on a monitor 222. In order to be displayed on the monitor 222, however, the target bitmap is first passed to a frame buffer 224 coupled to the monitor 222. When ready for display, the target bitmap is then passed to the frame 226.

Figure 4:
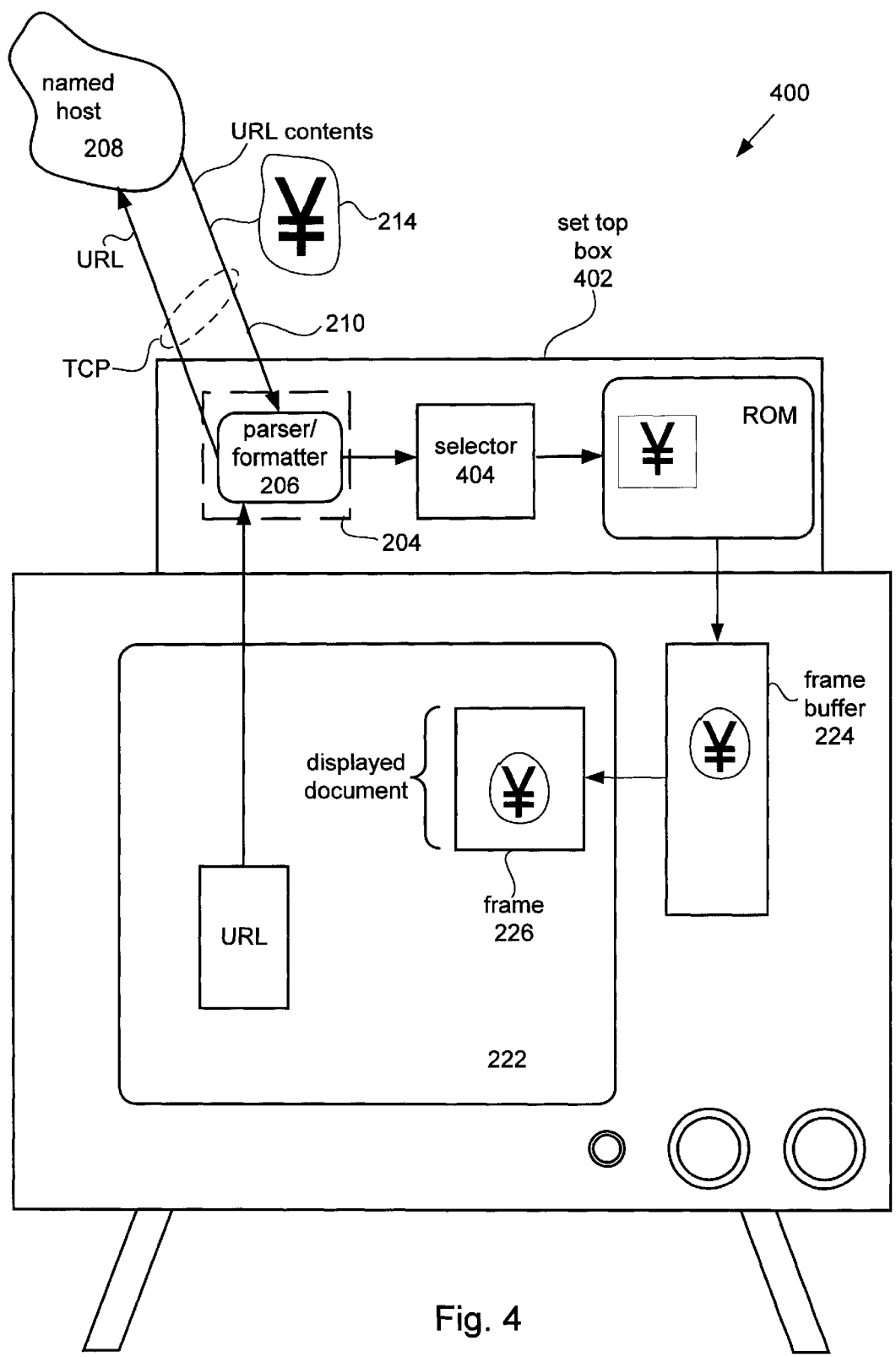
FIG. 4 illustrates the television system of FIG. 2 having a set top box with a ROM arranged to store provided target bitmaps each corresponding to a complex character.

In some situations, a group of offline processed bitmaps associated with complex characters are stored in a Read Only Memory (ROM) 400 included in a set top box 402 as shown in FIG. 4. In this situation, when a particular web page (or document) is retrieved, a selector unit 404 determines which of the bitmaps stored in the ROM 400 correspond to the characters associated with the retrieved document which are to be displayed on the monitor 222. The selected character bitmaps are then passed to the frame buffer 224 where they are stored until such time as they are displayed on the monitor 222. In this way, the complexity of the set top box is substantially reduced since the preprocessing of the raw character bitmaps has been performed offline and prior to being stored in the ROM 400.

Figure 5:
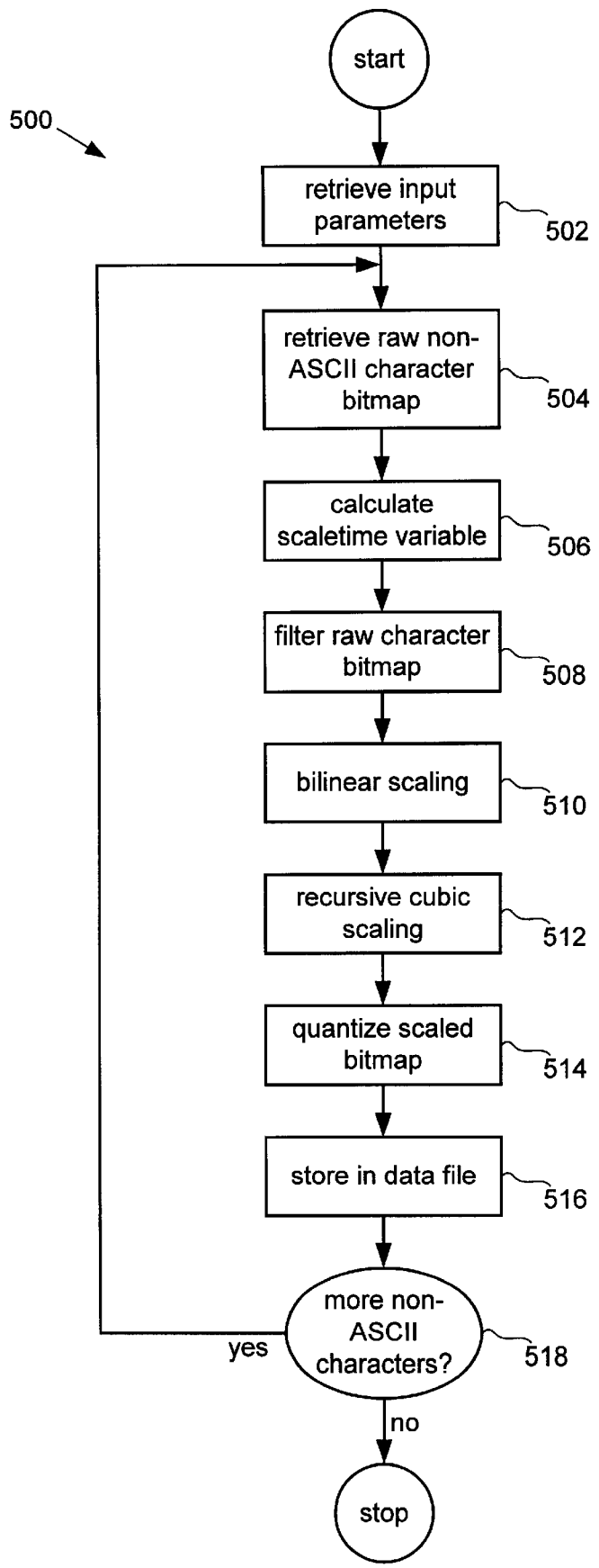
FIG. 5 is a flowchart detailing a process for providing a target bitmap in accordance with an embodiment of the invention.

FIG. 5 is a flowchart detailing a process 500 for providing a target bitmap in accordance with an embodiment of the invention. The process 500 begins at 502 by retrieving various input parameters. Such input parameters include a scaling factor indicative of the magnitude of the scaling performed on the raw character bitmap. Another input parameter is referred to as filtering level that indicates whether or not the filtering includes, or does not include, anti-aliasing. Yet another input parameter is referred to as bit per pixel which represents the number of bits per pixel for the particular system. By way of example, a system having 256 grayscale values, requires that each pixel be associated with at least 8 bits representing the 256 grayscale values. Once the input parameters have been retrieved, a non-ASCII character bitmap, if any, is retrieved at 504. At 506, a scaletime variable is determined indicative of the number of filtering operations performed by a cubic filter. By way of example, if the raw bitmap has dimensions of 128×128 and the raw bitmap is scaled to a first scaled bitmap having dimension of 80×80 and the target bitmap has dimensions of 20×20, then the scaletime factor is 4 since 80×80 represents the highest integral multiple size of the target bitmap that has dimensions that are smaller then the raw bitmap.

Once the scaletime variable has been determined, the raw character bitmap is filtered at 508 in order to substantially eliminate image artifacts that can result in loss of character stroke integrity when displayed on a low resolution monitor typical of standard television displays. In the described embodiment, the filtering is carried out using a 5×5 gaussian kernal in conjunction with a contrast enhancement factor that is used to increase the contrast between the lightest pixels and the darkest pixels of the displayed character. In this way, any loss of stroke integrity for those small strokes nearest larger, and therefore, brighter strokes is substantially avoided.

Once the character bitmap has been appropriately filtered, a bilinear scaling is performed on the filtered bitmap to form a first scaled bitmap having dimensions that are an integral multiple of the target bitmap at 510. Once the bilinear scaling is complete, a follow on recursive cubic scaling operation is performed at 512 to form the target bitmap having the desired dimensions suitable for storing in a video memory coupled to the television system. Using a cubic sampling scheme reduces the loss in information otherwise incurred using conventionally applied averaging techniques. In this way, overall stroke integrity is preserved. In those systems so required, the target bitmap is then quantized at 514. By quantized it is meant that, if so required, the bits per pixel are reduced commensurate with the display monitor. By way of example, if the raw character bitmap's luminance component is characterized as having 8 bits per pixel, representing 256 grayscale levels, but the display monitor is only capable of displaying 2 bits (i.e., 4 grayscale levels), then the bitmap is quantized from 8 bits to 2 bits. By way of example, typical standard television displays can accommodate a 2 bit dataword representing 4 shades of gray, therefore, in these type systems, the target bitmap having 256 shades of gray (i.e., 8 bits) must be reduced to 4 shades of gray. If this quantization was not performed, the displayed image would appear to be dimmer overall thereby adversely affecting the quality of the observed complex character.

Once the target bitmap has been appropriately quantized, it is stored in the video memory, or any other appropriate memory device at 516. If it is determined at 518 that additional non-ASCII characters are available, then control is passed to 504, otherwise processing stops.

Figure 6:
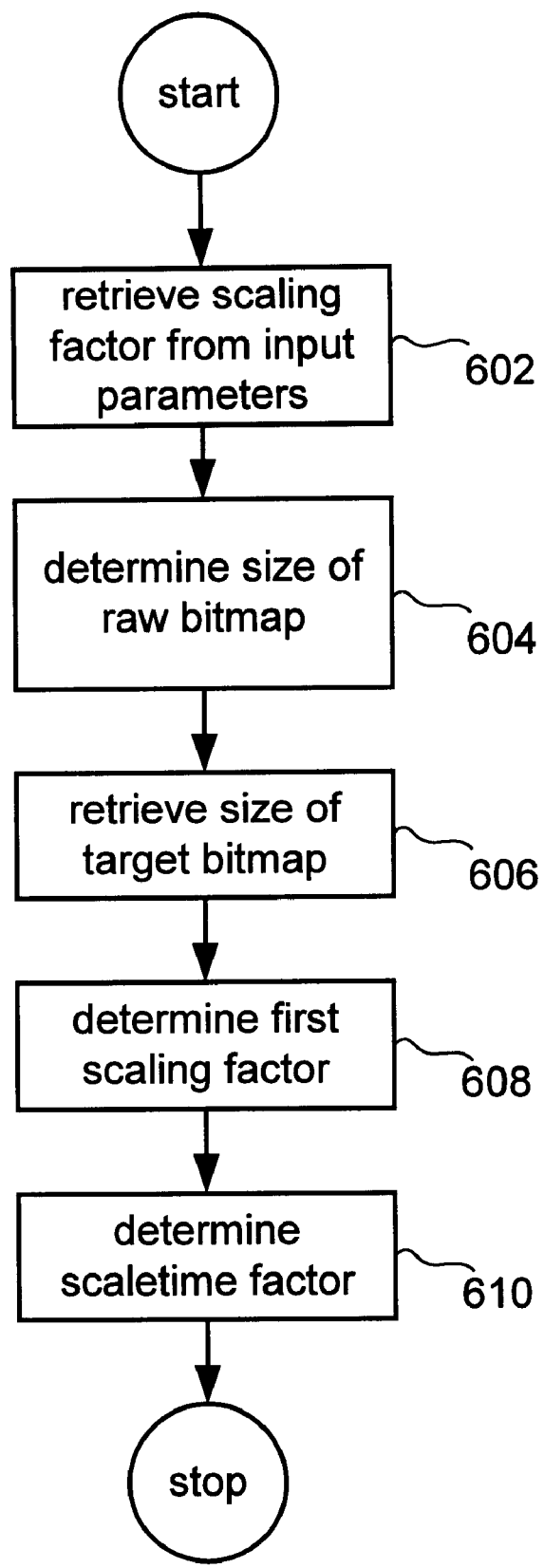
FIG. 6 shows a flowchart detailing a process for determining a scaletime factor in accordance with an embodiment of the invention.

FIG. 6 is a flowchart detailing a process 600 for determining a scaletime factor in accordance with an embodiment of the invention. It should be noted that the process 600 is one implementation of the determining 506. The process 600 begins at 602 by retrieving the scaling factor from the set of input parameters already provided. At 604, the size of the raw bitmap is determined while at 606 the size of the target bitmap is retrieved from the already provided set of input parameters. At 608, a first scale factor is determined by determining the dimensions (or size) of the bitmap that is the largest multiple integral value of the target bitmap. By way of example, if the raw bitmap has dimensions of 128×128, then a first scaled bitmap that is the largest multiple integral value of the target bitmap that is smaller then the raw bitmap is one having dimensions of 80×80. In the described embodiment, the first scaling factor is that scale factor used in the bilinear scaling operation, which for this example, is 120/80 (=1.5). At 610, the scaletime factor used in the cubic scaling operation is determined by dividing the size of the intermediate bitmap by the size of the target bitmap and dividing the result by "2". In the example discussed, the scaletime factor is determined by dividing "80" by "20" and dividing the result "4" by "2" resulting in a scaletime factor of "2". In the described embodiment, the scaletime factor indicates the number of cubic scaling operations performed that reduces the first scaled bitmap to the target bitmap.

Figure 7:
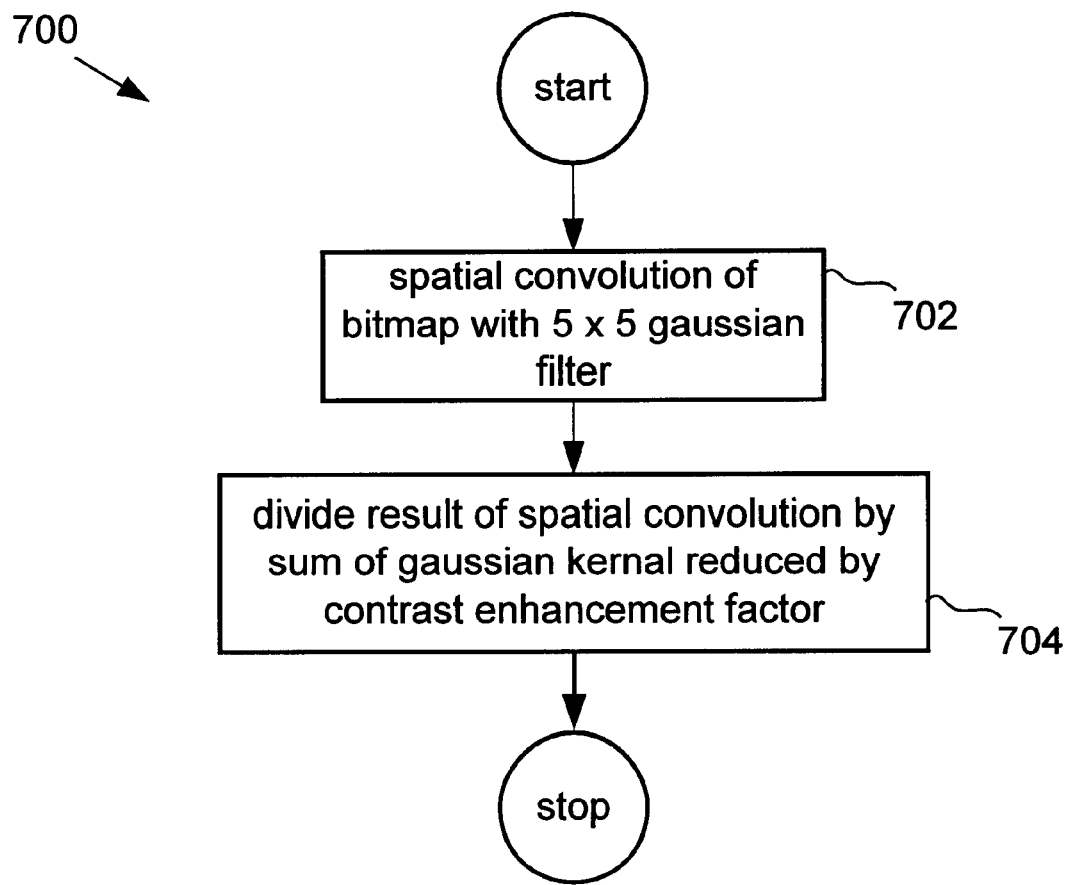
FIG. 7 is a flowchart detailing a process for filtering a raw bitmap in accordance with an embodiment of the invention.

FIG. 7 is a flowchart detailing a process 700 for filtering a raw bitmap in accordance with an embodiment of the invention. It should be noted that the process 700 is one implementation of the filtering 508. The process 700 begins at 702 by performing a spatial convolution of the raw bitmap with a 5×5 gaussian filter. In the described embodiment, the convolution takes the form of a matrix multiplication of the raw bitmap and the 5×5 gaussian filter. At 704, the result of the convolution is divided by the sum of the kernal of the gaussian filter reduced by a contrast enhancement factor. In the described embodiment, the contrast enhancement factor is the size of the kernal (i.e., the amplitude). In this way, both the adverse effects of screen flicker are substantially eliminated while providing improved contrast enhancement which avoids small strokes being obscured by nearby larger and therefore apparently brighter larger strokes.

Figure 8:
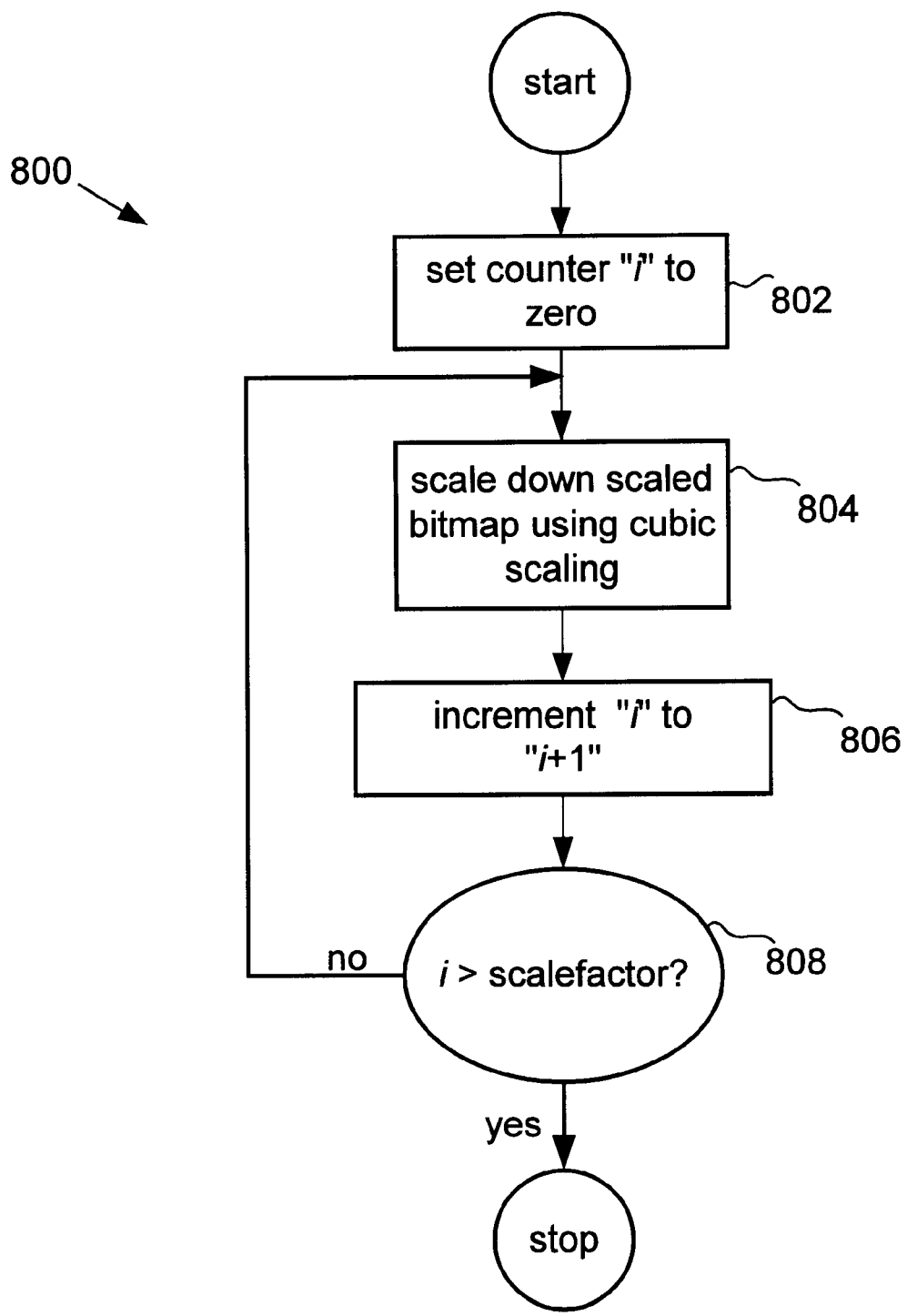
FIG. 8 is a flowchart detailing a process for performing a cubic scaling operation in accordance with an embodiment of the invention.

FIG. 8 is a flowchart detailing a process 800 for performing a cubic scaling operation in accordance with an embodiment of the invention. The process 800 begins at 802 by initializing a counter "i" to "0". At 804, the first scaled bitmap is scaled down using a cubic scaling operation. At 806, the counter "i" is incremented by "1". At 808, a determination is made whether or not the counter "i" is greater than the scaletime factor. If the counter "i" is not greater then the scaletime factor, then control is passed to 804 for further filtering, otherwise, the cubic scaling operation is complete.

Figure 9:
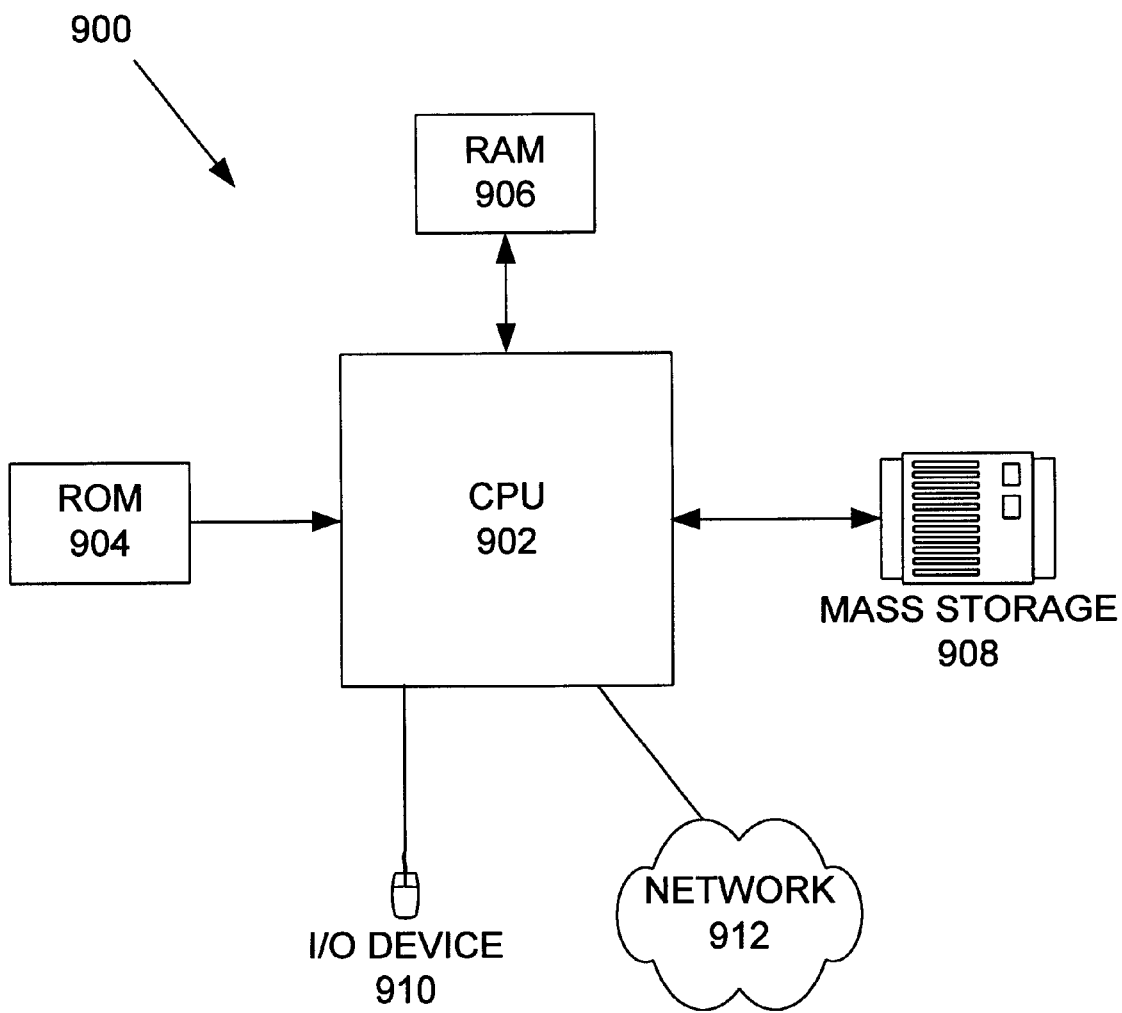
FIG. 9 illustrates a computer system employed to implement the invention.

FIG. 9 illustrates a computer system 900 employed to implement the invention. The computer system 900 or, more specifically, CPUs 902, may be arranged to support a virtual machine, as will be appreciated by those skilled in the art. As is well known in the art, ROM acts to transfer data and instructions uni-directionally to the CPUs 902, while RAM is used typically to transfer data and instructions in a bi-directional manner. CPUs 902 may generally include any number of processors. Both primary storage devices 904, 906 may include any suitable computer-readable media. A secondary storage medium 908, which is typically a mass memory device, is also coupled bi-directionally to CPUs 902 and provides additional data storage capacity. The mass memory device 908 is a computer-readable medium that may be used to store programs including computer code, data, and the like. Typically, mass memory device 908 is a storage medium such as a hard disk or a tape which generally slower than primary storage devices 904, 906. Mass memory storage device 908 may take the form of a magnetic or paper tape reader or some other well-known device. It will be appreciated that the information retained within the mass memory device 908, may, in appropriate cases, be incorporated in standard fashion as part of RAM 906 as virtual memory. A specific primary storage device 904 such as a CD-ROM may also pass data uni-directionally to the CPUs 902.

CPUs 902 are also coupled to one or more input/output devices 910 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 902 optionally may be coupled to a computer or telecommunications network, e.g., an Internet network or an intranet network, using a network connection as shown generally at 912. With such a network connection, it is contemplated that the CPUs 902 might receive information from the network, or might output information to the network in the course of performing the above-described method steps. Such information, which is often represented as a sequence of instructions to be executed using CPUs 902, may be received from and outputted to the network, for example, in the form of a computer data signal embodied in a carrier wave. The above-described devices and materials will be familiar to those of skill in the computer hardware and software arts.

Figure 10A:
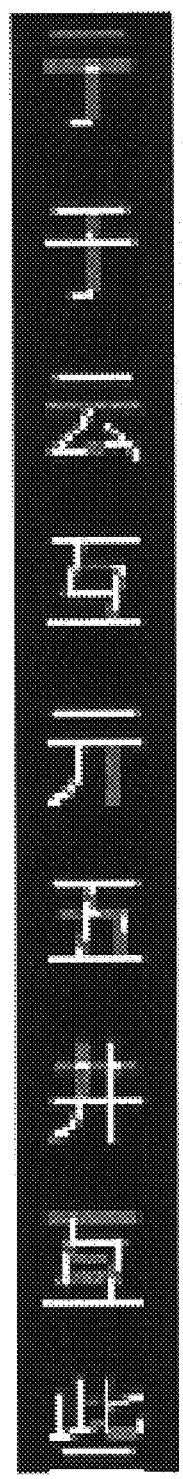
FIG. 10A illustrates conventionally processed complex characters displayed on a standard monitor.
Figure 10B:
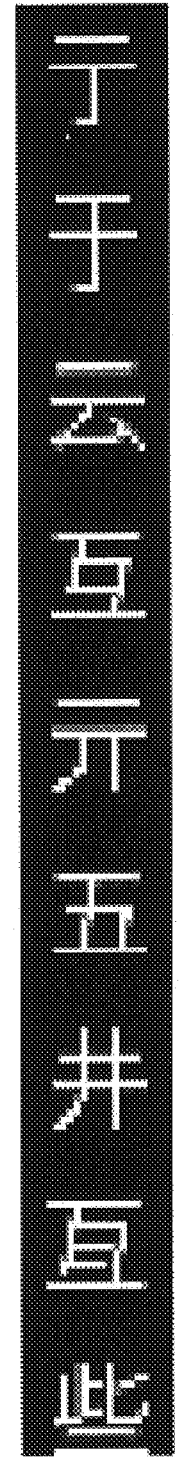
FIG. 10B illustrates the complex characters of FIG. 10A processed according to one embodiment of the invention.

FIG. 10A illustrates a series of conventionally processed complex characters as displayed on a standard television monitor. FIG. 10B illustrates the same series of complex characters processed according to one embodiment of the invention. As noted, the complex characters of FIG. 10B are substantially clearer and more distinct as compared to the blurred characters demonstrated in FIG. 10A. Although only a few embodiments of the present invention have been described, it should be understood that the present invention can be embodied in many other specific forms without departing from the spirit or the scope of the present invention. By way of example, the method of displaying a complex character can be applied to any video system.

While the present invention has been described as being used with a standard television system, it should be appreciated that the present invention may generally be implemented on any suitable video system. Therefore, the present examples are to be considered as illustrative and not restrictive, and the invention is not to be limited to the details given herein, but may be modified within the scope of the appended claims along with their full scope of equivalents.

What is claimed is:

1. A method for rendering an image of a complex character for display on a monitor, wherein the image is formed of a plurality of pixels arranged in rows and columns and is represented by a raw character bitmap, comprising:

filtering the raw character bitmap to form a filtered character bitmap performing a first type scaling operation on the filtered bitmap to form a first scaled bitmap;

determining a scalefactor based upon the first scaled bitmap and a target bitmap, wherein the target bitmap is suitable for storage in a memory device coupled to the monitor; and further recursively scaling the first scaled bitmap using a second type scaling operation to form the target bitmap based upon the scalefactor.

2. A method as recited in claim 1, wherein the first type scaling operation is a bilinear scaling operation.

3. A method as recited in claim 2, wherein the second type scaling operation is a cubic scaling operation.

4. A method as recited in claim 3, wherein the filtering further comprises:

multiplying the raw bitmap with a gaussian filter having a gaussian kernal to form a multiplied bitmap; and dividing the multiplied bitmap by a reduced kernal divisor to form the filtered bitmap, wherein the dividing by the reduced divisor increases the contrast between the darkest pixel and the brightest pixel of the filtered bitmap.

5. A method as recited in claim 4, wherein the reduced kernal divisor is the sum of the kernal reduced by a contrast enhancement factor, wherein the sum of the kernal is the summation of the elements of the kernal.

6. A method as recited in claim 5, wherein the kernal is a 5×5 gaussian kernal.

7. A method as recited in claim 1, wherein the monitor is coupled to a television system suitable for receiving television signals.

8. A method as recited in claim 7, wherein the television system is coupled to a set top box arranged to retrieve a requested document from a host computer, wherein the requested document includes the raw character bitmap.

9. A method as recited in claim 8, wherein the set top box includes a cache memory suitable for storing the target bitmap.

10. A method as recited in claim 9, wherein the cache memory is a Read Only Memory device arranged to store a plurality of provided target bitmaps each corresponding to a particular complex character.

11. An apparatus for rendering an image of a complex character for display on a monitor, wherein the image is formed of a plurality of pixels arranged in rows and columns, and wherein the complex character is represented by a raw character bitmap, comprising:
   a filtering unit that receives the raw character bitmap and performs a selected filtering operation to form a filtered character bitmap;
   a decimator unit coupled to the filtering unit that receives the filtered character bitmap and performs a series of multiple type scaling operations on the received filtered character bitmap to form a target bitmap, wherein the target bitmap is representative of a selected font size corresponding to the displayed image; and
   a memory device coupled to the decimator unit arranged to store the target bitmap, wherein when a complex character corresponding to a selected one of the target bitmaps is to be displayed on the television monitor, the selected bitmap is passed to a frame buffer unit coupled to cache memory device.

12. An apparatus as recited in claim 11, wherein the filtering operation comprises:
   multiplying the raw character bitmap with a gaussian filter having a kernal to form a multiplied bitmap; and
   dividing the multiplied bitmap by a reduced kernal divisor to form the filtered bitmap such that the contrast between the darkest pixel and the brightest pixel of the filtered bitmap is enhanced.

13. A method as recited in claim 12, wherein the reduced kernal divisor is the sum of the kernal reduced by a contrast enhancement factor, wherein the sum of the kernal is the summation of the elements of the kernal.

14. A method as recited in claim 13, wherein the kernal is a 5×5 gaussian kernal.

15. An apparatus as recited in claim 11, wherein the performs a series of multiple type scaling operations on the received filtered character bitmap to form a target bitmap comprises:
   performing a first type scaling operation on the filtered character bitmap to form a first scaled character bitmap;
   determining a scalefactor based upon the first scaled character bitmap and the target bitmap; and
   further recursively scaling the first scaled bitmap using a second type scaling operation to form the target bitmap, wherein the recursion is based upon the scalefactor.

16. An apparatus as recited in claim 15, wherein the first type scaling operation is a bilinear scaling operation and wherein the second type scaling operation is a cubic scaling operation.

17. An apparatus as recited in claim 16, wherein the apparatus is a set top box coupled to a television arranged to retrieve a selected document from a host computer connected thereto.

18. An apparatus as recited in claim 17, wherein the host computer is part of a computer network.

19. An apparatus as recited in claim 18, wherein the computer network is the Internet and the requested document is an HTML document.

20. A set top box as recited in claim 11, wherein the memory device is a Read Only Memory device arranged to store the target bitmaps corresponding to the complex characters.

* * * * *